United States Patent [19]
Morita et al.

[11] Patent Number: 5,831,268
[45] Date of Patent: Nov. 3, 1998

[54] SENSING DEVICE FOR REFLECTIVE CLEAR MATERIAL USING INFRARED LED

[76] Inventors: Yoshimitsu Morita, 17612 Beach Blvd., Ste 7-A, Huntington Beach, Calif. 92647; Bunichiro Morita, 1-8 Kitahama Higashi, Chuo-ku, Osaka, Japan

[21] Appl. No.: 753,440
[22] Filed: Nov. 25, 1996
[51] Int. Cl.$^6$ ............................................. G01J 1/04
[52] U.S. Cl. ........................................ 250/341.8; 250/900
[58] Field of Search .......................... 250/341.8, 338.1, 250/343, 577, 900, 901

[56] References Cited

U.S. PATENT DOCUMENTS

| | | |
|---|---|---|
| 3,454,759 | 7/1969 | Calhoun . |
| 3,741,656 | 6/1973 | Shapiro . |
| 3,818,470 | 6/1974 | Hirsbrunner et al. . |
| 3,882,319 | 5/1975 | Clement et al. . |
| 4,201,914 | 5/1980 | Perren . |
| 4,247,784 | 1/1981 | Henry . |
| 4,365,165 | 12/1982 | Vedova . |
| 4,755,674 | 7/1988 | Schaaf . |
| 4,925,310 | 5/1990 | Feppon et al. ...................... 250/341.8 |
| 5,323,005 | 6/1994 | Merkel . |

Primary Examiner—Edward P. Westin
Assistant Examiner—Richard Hanig
Attorney, Agent, or Firm—Richard C. Litman

[57] ABSTRACT

A sensing apparatus is disclosed for detecting reflective materials in a non-invasive and non-contact manner. The sensing apparatus includes a housing, sensing means disposed within the housing. Circuitry is provided for interpreting the information collected by the sensors. A power supply is coupled to the sensors and the circuitry with cables. The sensing means consist of an infrared LED and a detective diode. The infrared LED and the detective diode are disposed in a disk which is positioned at the proximal end of the hollow tube. The distal end of the hollow tube is appropriately sealed using a sealing cap. The sensing apparatus is also capable of determining the distance from the sensing means to the reflective surface in question.

7 Claims, 4 Drawing Sheets

SENSING DEVICE FOR REFLECTIVE CLEAR MATERIAL USING INFRARED LED

BACKGROUND OF THE INVENTION

1. Field of the Invention

The present invention relates to sensing devices and more particularly to electro-optical devices for detecting the presence of, or determining the distance to, a reflective material.

2. Description of the Prior Art

The instant invention is specifically concerned with a device which uses light emission and detection sources for non-contact detection and measurement of distance to the surface of a reflective material. There are various techniques currently used for determining the level of a liquid contained in a vessel. For example, the most commonly used technique is to invasively introduce a measuring device, such as a dipstick, float, ultrasonic transducer (including non-contact variations), capacitance probe, etc., into the liquid. This particular technique, however, introduces the possibility of contamination, thereby requiring constant inspection of the system. In an attempt to alleviate the aforementioned problem, several non-invasive measuring techniques have been developed. One such technique involves the use of a light beam to determine the level of the liquid. It is well known that certain relationships exist between the angle of incidence and the angle of reflection upon a surface. In utilizing such relationships, a beam of light is directed to and reflected from the surface of the liquid. The problem with such techniques lies in the fact that the difference between the incidence and reflection angles is typically very small. Thus, accurate optical equipment is necessary to measure such minute differences, thereby increasing the cost of the system. Other systems which utilize light to determine the level of a fluid exist, but some are also invasive.

Heretofore, numerous systems and methods have been introduced to measure the level of a liquid. However, most of these systems and methods are invasive or expensive. For example, U.S. Pat. No. 3,454,759 issued on Jul. 8, 1969 to Calhoun discloses an infrared liquid level system. The system is designed for use with containers which may include foam above the liquid. The system includes a light source having frequencies in both the visible and infrared bands. The container passes the light in both the visible and infrared bands. The liquid passes the visible light while attenuating light in the infrared band. The foam in the container attenuates the light in both the visible and infrared bands. A signal from an infrared cell is used to indicate that either the liquid or the foam is at a desired level, while a signal from a second infrared cell is used to indicate that the liquid or the foam is not at the desired level.

U.S. Pat. No. 3,741,656 issued on Jun. 26, 1973 to Shapiro discloses a fill level measuring apparatus. The apparatus employs optical means in order to measure the level of liquid or granular substance in a container. The apparatus is capable of functioning under conditions where physical contact with or even close proximity to the substance is impractical or undesirable. The apparatus incorporates a collimated light source having a narrow beam width relative to the diameter of the container. The apparatus is capable of using specularly reflected light, scattered light, or light transmitted through the substrate.

U.S. Pat. No. 3,818,470 issued on Jun. 18, 1974 to Hirsbrunner et al. discloses a fluid level detector for indicating the presence or absence of a predetermined medium. The device includes energy emitting means, energy refracting means, and energy sensing means which is in selective communication with the energy emitting means. The energy refracting means includes an energy transmitting body portion which is bounded in part by at least two non-parallel surface portions in the path of the emitted energy. One of the surface portions is adapted to communicate with the medium and effect transmission of energy through the interface when such communication is established, and to reflect energy during the absence thereof.

U.S. Pat. No. 3,882,319 issued on May 6, 1975 to Clement et al. discloses an automatic melt level control for growth of semiconductor crystals. The melt level control includes a feedback loop including level sensing means for controlling a lift motor in order to move the melt-containing crucible. The melt level is sensed by alternately transmitting two pulsed beams, or rays, having a narrow visible red light radiation to the melt surface and measuring the radiation level in the reflected pulse rays subsequent to transmission through a lens system. When the melt level is correct, the magnitudes of the reflected pulses are equal and no control signal results. When the melt level falls or rises, the magnitudes of the reflected pulses change and a difference signal is generated causing the crucible to rise or fall accordingly.

U.S. Pat. No. 4,201,914 issued on May 6, 1980 to Perren discloses an electrical instrument to detect the presence of liquids. The instrument includes one monochromatic infrared source, a light conductor which totally reflects infrared radiation from at least one surface, an infrared detector, and signal processing circuitry. An electronic circuit is provided which causes the system to oscillate when no liquid is present. The instrument may be operated in a self-monitoring mode by monitoring the oscillations with two monostable multivibrators connected in parallel.

U.S. Pat. No. 4,247,784 issued on Jan. 27, 1981 to Henry discloses a method and apparatus for measuring the level of a light-reflecting substance with regard to a reference point. The method includes directing a beam of light at the substance, receiving the diffuse reflected light on an arrangement of photoelectric sensor elements in a manner such that displacement of the reflected light from a predetermined position on the sensor arrangement is sensed electronically. This generates a signal which is proportional to the displacement of the reflected beam from the predetermined position on the element arrangement. The electrical signal is then used to determine the amount of deviation of the level of the substance from a predetermined point.

U.S. Pat. No. 4,365,165 issued on Dec. 21, 1982 to Vedova discloses a level measurement device. The device is suited for measuring the level of any substance in situations where such measurement must be made from a distance because of toxicity, hazard, high temperature, etc. The device utilizes a light source which projects a light beam on the medium whose level is to be measured. The light is detected by a plurality of sensors along a line forming an angle with respect to the incident line of the light source.

U.S. Pat. No. 4,755,674 issued on Jul. 5, 1988 to Schaaf discloses an infrared detector. The detector includes at least one infrared-sensitive detector element and at least one infrared source, for directing infrared radiation onto the detector element, disposed in a common housing with the detector. A pulse generator is connected to the infrared source. A recognition circuit is connected to the detector element for identifying the pulse sequence of the detector output in order to continuously check the functioning of the detector.

U.S. Pat. No. 5,323,005 issued on Jun. 21, 1994 to Merkel discloses a method and apparatus for monitoring energy radiant from a dispensed heated material. The material may be a hot melt adhesive which is dispensed onto a substrate. The apparatus utilizes an infrared sensor having a wand located downstream of the dispensed material for receiving the radiant energy. The wand is provided with internal air for cooling and providing laminar air flow in the vicinity of the lens in order to prevent the accumulation of airborne contaminants on the lens. The wand is also provided with means for aiming the light.

None of the above inventions and patents, taken either singly or in combination, is seen to describe the instant invention as claimed.

SUMMARY OF THE INVENTION

Accordingly, it is a principal object of the invention to provide an apparatus for non-contact sensing of reflective materials.

It is another object of the invention to provide an apparatus which utilizes an infrared LED and circuitry to detect the presence of a liquid.

It is a further object of the invention to provide an apparatus capable of determining the distance to the surface of a reflective material.

It is an object of the invention to provide improved elements and arrangements thereof in an apparatus for the purposes described which is inexpensive, dependable and fully effective in accomplishing its intended purposes.

In accordance with an object of the invention a sensing apparatus is provided for sensing reflective materials in a non-invasive, non-contact manner. The sensing apparatus includes a housing, sensing means disposed within the housing, circuitry for interpreting the information collected by the sensors, and a source of power. The source of power may be contained within the housing or it may be located externally. The power supply is coupled to the sensing means and the circuitry with cables. The housing consists of a hollow tube which has a proximal end and a distal end when positioned relative to the material to be sensed. The sensing means consists of a light emitter and a detector. The emitter and the detector are disposed in a disk which is positioned at the proximal end of the hollow tube. The distal end of the hollow tube is appropriately sealed using a sealing cap or equivalent sealing means. The sealing means also includes an aperture for allowing the cables to pass. In preferred embodiments of the invention, an extension tube is positioned at the proximal end of the hollow tube in order to converge light emitted from the emitter and improve the performance of the detector.

In accordance with another object of the invention a sensing apparatus is provided for detecting the presence of a liquid. The sensing apparatus works in a non-invasive manner such that direct contact with the liquid is avoided. The sensing apparatus includes a housing having a hollow interior and a generally tubular shape. Emission and detection means are disposed within the housing for directing a beam of light towards the surface of the liquid and receiving the reflected light, respectively. A disk containing a plurality of apertures, suited for receiving the emission and detection means, is secured to the proximal end of the housing. Circuitry is provided for controlling the emission and detection means. A power supply is coupled to the circuitry, the emission means, and the detection means via cables. A sealing cap is secured to the distal end of the housing. The sealing cap includes an aperture for the cables from the power supply to pass through if the power supply is externally located.

In preferred embodiments of the invention, an infrared LED is used to direct light towards the surface of the liquid. A detective diode is correspondingly used to receive the light reflected. Multiple detective diodes may be used in order to improve the performance of the sensing apparatus. A lens may also be disposed over the emission means in order to converge the light and improve overall performance.

In accordance with another object of the invention, a sensing apparatus is provided for determining the distance to the surface of a reflective material. The sensing apparatus determines distance without making contact and is especially suited for use with liquids. The sensing apparatus includes a housing having a hollow interior and a generally tubular shape. An infrared LED is provided for directing a beam of infrared light towards the surface of the reflective material. At least one detective diode is used to receive the infrared light reflected from the surface of the reflective material. A disk is secured to the proximal end of the housing. The disk contains a plurality of apertures which receive the infrared LED and the detective diode. Circuitry is provided for controlling the infrared LED and the detective diode. A power supply is coupled via cables to the circuitry, the infrared LED, and the detective diodes. A sealing cap is secured to the distal end of the housing. The sealing cap includes an aperture for the cables from the power supply to pass when externally located. A lens is disposed over the infrared LED in order to converge the light emitted from the infrared LED and improve the resolution and usable range of the sensing apparatus. A power regulator is coupled to the power supply in order to provide a continuous supply of dc voltage. A voltage comparator is used to compare the voltage from the power regulator to the voltage from the detective diode and produce a signal which is indicative of the distance between the detective diode and the surface of the reflective material.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figures 1, 2:
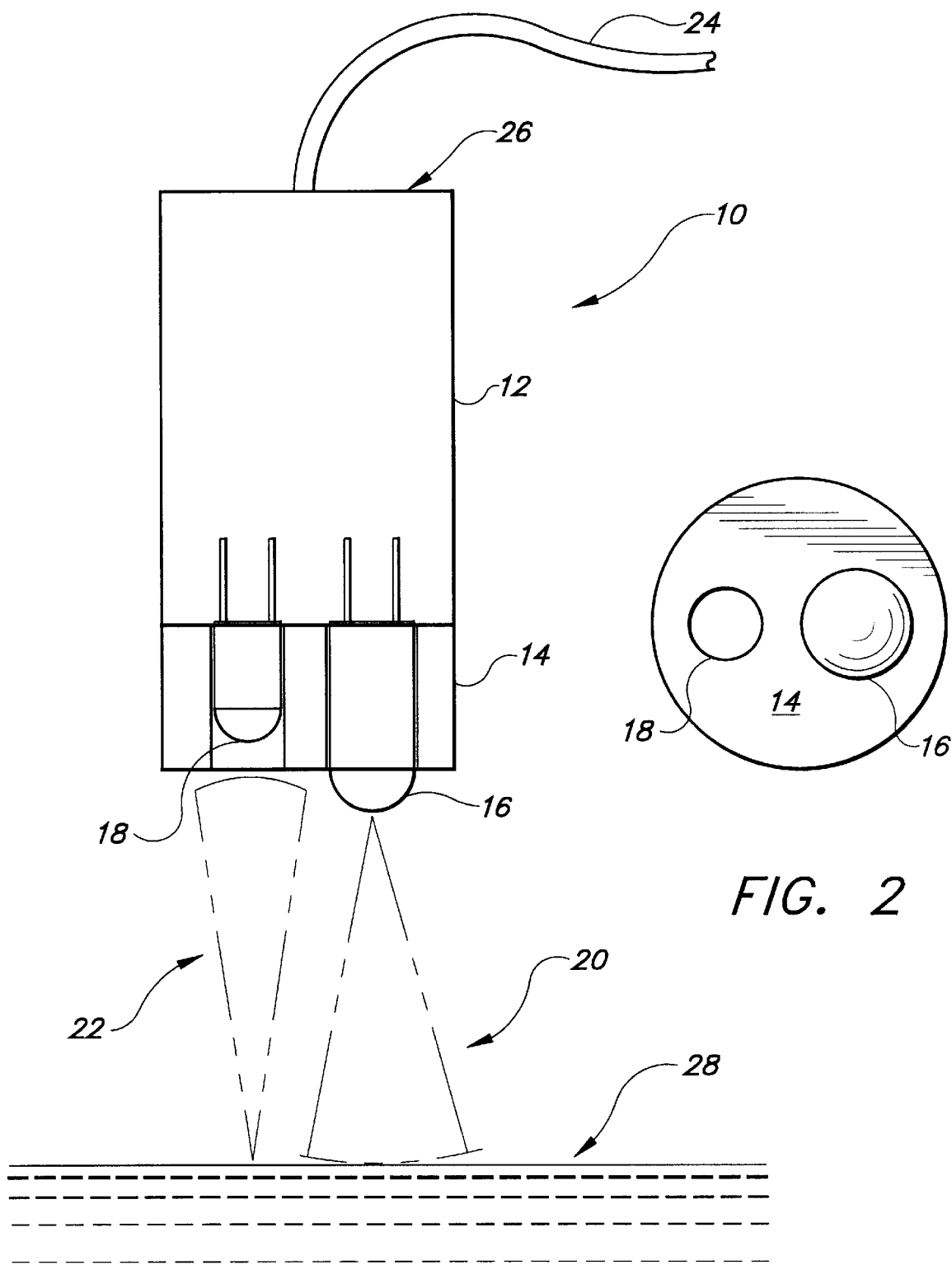
FIG. 1 is cutaway of a non-contact sensing device in accordance with the present invention.
FIG. 2 is a bottom plan view of the non-contact sensing device.

With reference to the drawings and initially to FIGS. 1 and 2, a sensing apparatus 10 is shown for non-contact sensing of reflective materials. The sensing apparatus 10 is capable of determining the distance to the surface of the reflective material and is especially suited for use with liquids 28. The non-contact mode of operation of the sensing apparatus 10 allows it to be used in situations where contact may contaminate the liquid or where the liquid may be toxic.

The sensing apparatus 10 includes a housing 12 which has a hollow interior and a generally tubular shape. The housing 12 is designed such that it faces the liquid 28 in a perpendicular alignment. Thus, there is defined a proximal and a distal end for the housing 12 with respect to the liquid 28. A disk 14 is secured to the proximal end of the housing 12 such that a snug fit is created. The disk 14 also contains a plurality of apertures. An infrared LED 16 is fitted into one of the apertures contained in the disk 14. The infrared LED 16 is used to direct a beam of infrared light 20 towards the surface of the liquid 28. A detective diode 18 is also fitted into one of the apertures contained in the disk 14. When the infrared light 20 becomes incident on the surface of the liquid 28, it is reflected towards the sensing apparatus 10. The detective diode 18 is used to receive the reflected infrared light 22. In preferred embodiments of the invention, the infrared LED 16 is capable of pulsed operation so that the current flowing therethrough may be increased.

The sensing apparatus 10 also includes circuitry 30 which is used to control the infrared LED 16 and the detective diode 18. A power supply 32 is coupled to the circuitry 30, the infrared LED 16, and the detective diode 18 via cables 24. A sealing cap 26 is secured to the distal end of the housing 12. The sealing cap 26 includes an aperture for the cables 24 from the power supply 32 to pass through. When the disk 14 and the sealing cap 26 are secured to the housing 12, external light is prevented from entering into the housing 12 and possibly interfering with the operation of the detective diode 18.

Figure 5:
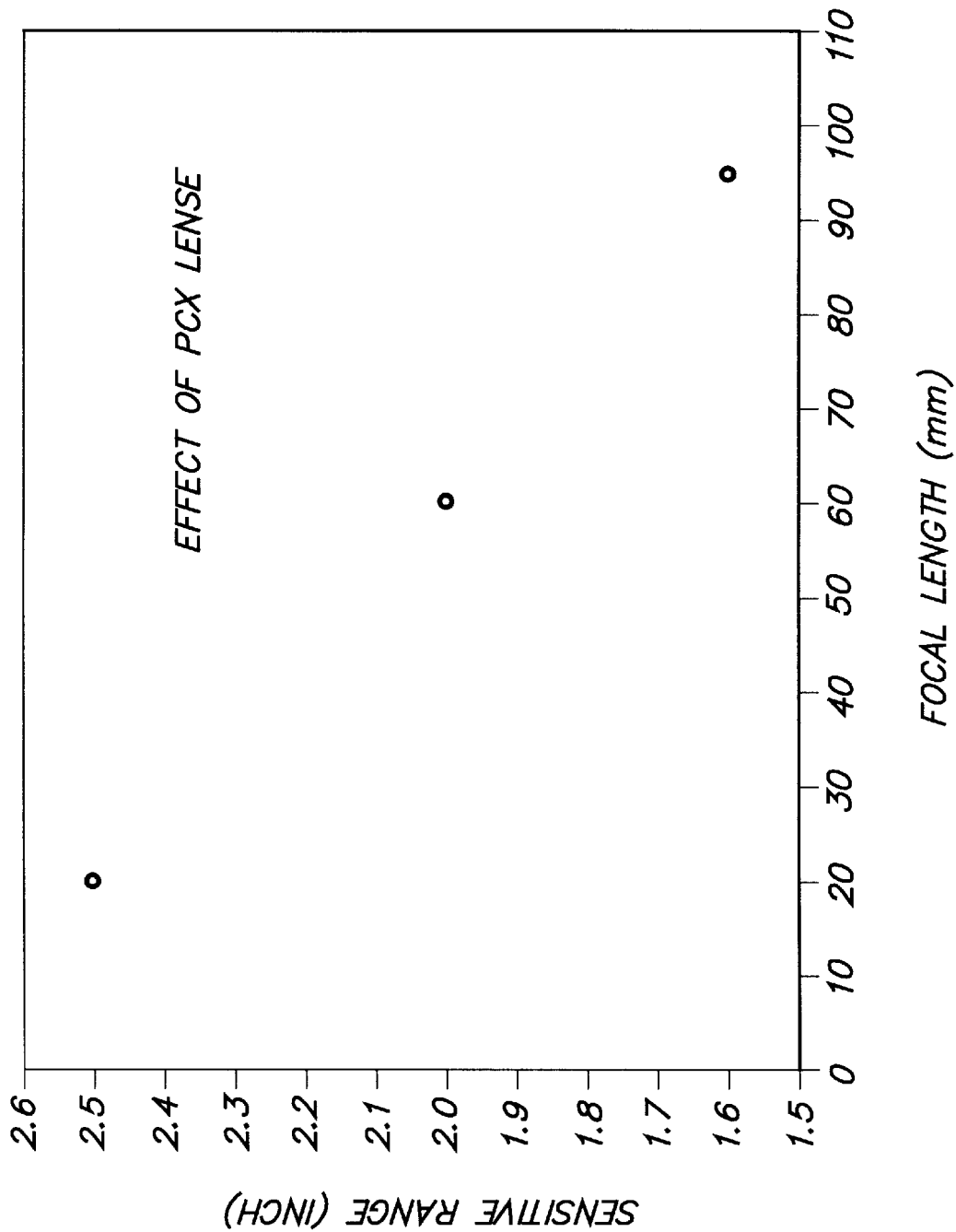
FIG. 5 is a plot of the range with respect to the focal length, illustrating the effect of a lens.

In preferred embodiments of the invention, a lens (not shown), such as a plano convex lens, may be disposed over the infrared LED 16. The lens is used to converge the infrared light 20 produced by the infrared LED 16, thereby improving the resolution and usable range of the sensing apparatus 10. FIG. 5 illustrates the improved effects of a lens on the sensing apparatus 10. The sensing apparatus 10 was configured to detect the liquid 28 from a distance of approximately 2 inches. As the focal length of the lens is decreased, the sensing distance of the apparatus is increased. When a plano convex lens having a focal length of about 19 mm is used, the range of the sensing apparatus 10 is increased by nearly 2.5 times. The range of the sensing apparatus 10 may be further improved by attaching an extension tube (not shown) to the proximal end of the housing 12. The extension tube is simply a hollow cylindrical tube of the same inside diameter as the housing. The extension tube is used to further converge the infrared light 20 produced by the infrared LED 16. The use of the extension tube creates a focusing effect which greatly improves the performance of the sensing apparatus 10. As the length of the extension tube is increased, the accuracy of the sensing apparatus 10 is similarly increased. Thus, the fraction of light returning to the extension tube increases because of the narrow reflective angle on the object surface. Improved performance of the sensing apparatus 10 may be achieved by incorporating multiple detective diodes 18. For example, the sensing distance may be increased by 1.5 times (square root of 3) if 3 detective diodes 18 are used. Furthermore, multiple infrared LED's 16 may be provided to further improve performance of the sensing apparatus 10 due to the increased intensity of the infrared light 20 directed toward the surface of the liquid 28.

Figure 3:
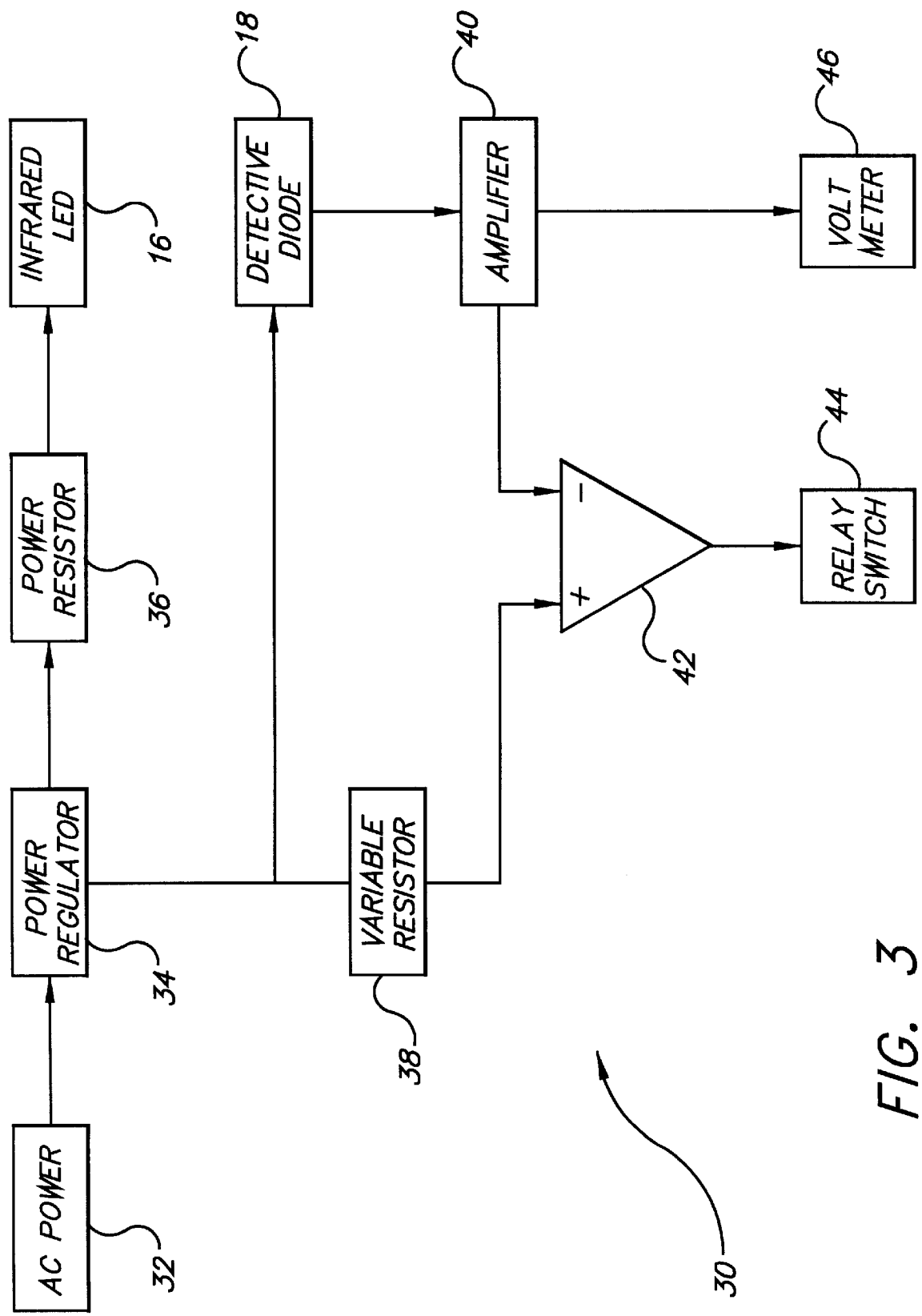
FIG. 3 is a block diagram of the circuitry for the non-contact sensing device.

Turning now to FIG. 3, the circuitry 30 of the sensing apparatus is illustrated in a block diagram format. A power supply 32 is used to supply current to the circuitry 30. A power regulator 34 is coupled to the power supply 32 in order to produce a continuous supply of dc voltage. The power regulator 34 has three outputs. The first output of the power regulator 34 is coupled to the input of a power resistor 36. The output of the power resistor 36 is coupled to the infrared LED 16 in order to is energize it. The second output of the power regulator 34 is coupled to the input of the detective diode 18. The output of the detective diode 18 is coupled to an amplifier 40 which has two outputs. The first output of the amplifier 40 is coupled to a volt meter 46 in order to monitor the operation of the detective diode 18. The voltage being monitored by the volt meter 46 is indicative of the distance to the liquid 28. The volt meter 46 is only necessary if the sensing apparatus 10 is being used to measure the distance to the liquid 28. A voltage comparator 42 is used compare the voltage from the power regulator 34 with the voltage from the detective diode 18. The third output of the power regulator 34 is coupled to the input of a variable resistor 38. The output of the variable resistor 38 is coupled to the inverted input of the voltage comparator 42, while the second output of the amplifier 40 is coupled to the normal input of the voltage comparator 42. The variable resistor 38 allows the user to select a desired reference voltage. When the voltage from the detective diode 18 reaches the reference value, the voltage comparator 42 is pinned high. The output of the voltage comparator 42 is then a signal which is indicative of the presence of the liquid 28. This signal is used to operate a relay switch 44 or other control systems for operating an external controller.

If liquid 28 is present in the sensing area, then the voltage resulting from the voltage comparator 42 is directly related to the distance between the detective diode 18 and the surface of the liquid 28. By applying the necessary mathematical relationships and calibrating the sensing apparatus 10, the distance between the detective diode 18 and the surface of the liquid 28 may be determined. It is known that the optical output of the infrared LED 16 is proportional to the current passing through it. Accordingly, the reflection on the liquid 28 will be proportional to the input current into the infrared LED 16 provided that the distance from the infrared LED 16 to the liquid 28 remain constant. This relationship also allows the sensitivity of the sensing apparatus 10 to be proportional to the amount of power provided to the infrared LED 16. For example, doubling the current will increase the sensing distance by the square root of 2.

Figure 4:
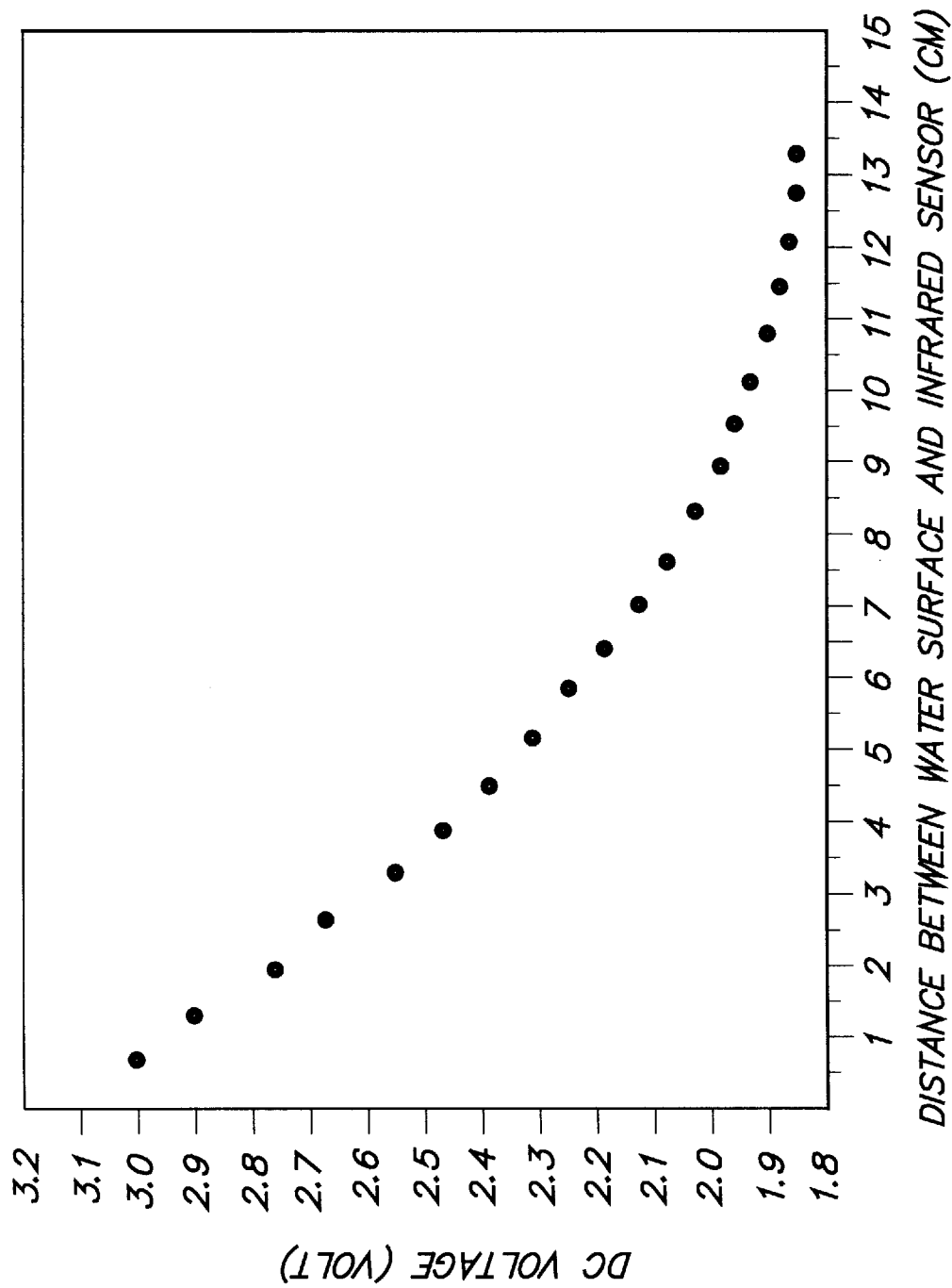
FIG. 4 is a plot of the voltage with respect to the distance from the sensor.

FIG. 4 is a plot illustrating this relationship. In performing the tests, the sensing apparatus 10 was configured 1.2 mm accuracy at a 2 inch distance. A 5 volt power regulator 34 and a 3 inch extension tube were used. FIG. 4 shows the dc voltage measured directly from the amplifier 40 with respect to the distance between the liquid 28 and the detective diode 18. After repeating multiple tests and performing the necessary statistical calculations on the result, the resolution of the sensing apparatus 10 was determined to be 0.28 mm. In determining the resolution of the sensing apparatus 10, it must be appreciated that two detection points are necessary, the high and the low levels. These two levels actually determine when the pump is turned on or off. If consideration is given to the characteristics of the pump being used to maintain the fluid level and the type of fluid used, an effective accuracy may be calculated for specific applications. However, this effective accuracy is independent of the 0.28 mm resolution, which is the pure accuracy of the sensing apparatus 10 itself.

It is to be understood that the present invention is not limited to the sole embodiment described above, but encompasses any and all embodiments within the scope of the following claims.

We claim:

1. Apparatus for non-contact measurement of distance to a liquid surface comprising:
    a housing having a hollow interior and a generally tubular shape, said housing further including a proximal end and a distal end;

an infrared LED disposed within said housing for directing a beam of light towards the liquid surface;

photo detection means disposed within said housing for receiving light reflected from the liquid surface;

a disk containing a plurality of parallel apertures therethrough and secured to the proximal end of said housing, said apertures maintaining said infrared LED and said photo detection means parallel to one another;

a power supply;

a voltage comparator having an inverted input coupled to said power supply, a normal input coupled to said photo detection means, and an output;

a plurality of cables for coupling said power supply to said infrared LED, and said photo detection means; and sealing means secured to the distal end of said housing for preventing external light from entering said housing, said sealing means including an aperture for allowing said plurality of cables to pass.

2. Apparatus as recited in claim 1 further comprising a lens disposed over said infrared LED.

3. Apparatus as recited in claim 1 further comprising:

a power regulator coupled to said power supply for providing a continuous supply of dc voltage;

a power resistor for coupling said infrared LED to said power regulation means; and a variable resistor for coupling said photo detection means to said power regulation means.

4. Apparatus as recited in claim 3 wherein said infrared LED is capable of pulsed operation.

5. Apparatus as recited in claim 3 further comprising:

an amplifier coupling said voltage comparator to said photo detection means, said amplifier having an input coupled to said photo detection means and an output coupled to the inverted input of said voltage comparator.

6. Apparatus as recited in claim 5 wherein:

said amplifier further includes a second output; and a voltage meter is coupled to the second output of said amplifier.

7. Apparatus as recited in claim 1 further comprising a switch relay coupled to the output of said voltage comparator for controlling an external device.

* * * * *